(No Model.)
R. H. ST. JOHN.
DEVICE FOR THE COMPENSATION OF WEAR IN NEEDLE BARS.
No. 256,068. Patented Apr. 4, 1882.
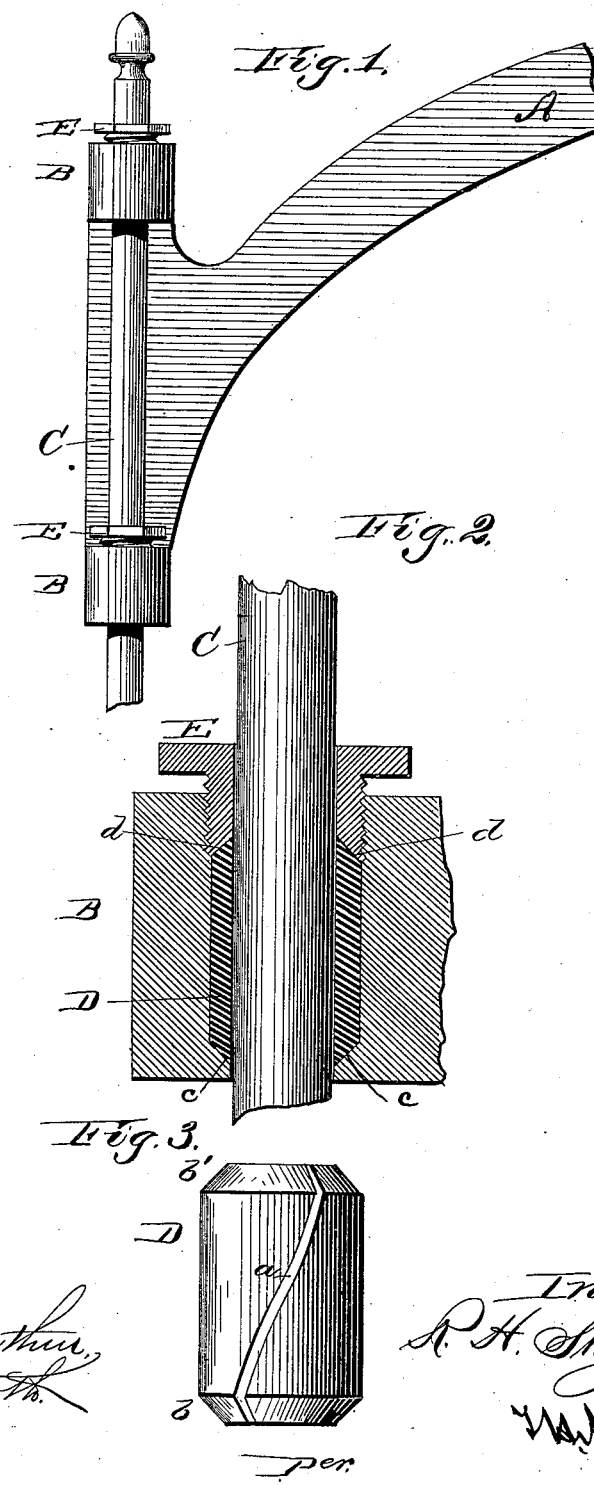

UNITED STATES PATENT OFFICE.

ROSWELL H. ST. JOHN, OF TOLEDO, OHIO, ASSIGNOR TO THE UNION MANUFACTURING COMPANY, OF SAME PLACE.

DEVICE FOR THE COMPENSATION OF WEAR IN NEEDLE-BARS.

SPECIFICATION forming part of Letters Patent No. 256,068, dated April 4, 1882.

Application filed January 21, 1882. (No model.)

*To all whom it may concern:*

Be it known that I, ROSWELL H. ST. JOHN, of Toledo, in the county of Lucas and State of Ohio, have invented certain new and useful Improvements in Devices for the Compensation of Wear in Needle-Bars; and I do hereby declare that the following is a full, clear, and exact description thereof, reference being had to the accompanying drawings, and to the letters of reference marked thereon, which form part of this specification.

Figure 1 is a side elevation of a sewing-machine with my invention attached. Fig. 2 is a vertical section through one of the bearings. Fig. 3 is a view of my improved bushing.

The object of my invention is to compensate for the wear of the needle-bars of sewing-machines and the bushings through which such bars are guided in their vertical motions. By the invention which I shall hereinafter describe I maintain a perfectly concentric and substantial bearing or bushing, and at the same time provide for contracting the bushing about a needle-bar as the parts wear, thereby preventing a needle-bar from wabbling in its guides or bearings.

The following is a full and exact description of my invention, which, when taken in connection with the annexed drawings, will enable others skilled in the art to fully understand it.

A designates the arm of a sewing-machine, having short bearings B B formed on it in the usual manner. C is a needle-bar, which plays through bushings D applied in said bearings, and also through nuts screwed into the bearings. Each bearing B is drilled through, after which a hole of greater diameter is drilled into it, terminating in a tapered seat, $c$. (Shown in Fig. 2.) The upper part of this largest hole is screw-tapped to receive a tubular nut, E, the hole through which is equal in diameter to the smallest hole through the bearing B, and such hole terminates in an outwardly-flaring seat, $d$.

D designates a cylindrical tubular bushing, made of any suitable metal, through which is a slit, $a$, extending from one extremity of it to the other, for the purpose of allowing it to be contracted diametrically about the needle-bar which passes through it. The ends of this compressible bushing are tapered or beveled, as shown at $b\ b'$. The bushing D is dropped into the bearing B, and its beveled end $b$ rests upon the correspondingly-beveled seat $c$. The nut E is then screwed down upon the upper beveled end, $b'$, of the bushing and the needle-bar passed through it. The nut is then turned down until the bushing properly embraces this bar. When the needle-bar begins to run loose the nut E is screwed down by means of a wrench, which contracts the bushing and readjusts the same to the bar. This contraction of the bushing takes place equally from one end to the other by reason of the beveled surfaces acting on the principle of wedges, the open oblique slit $a$ allowing the edges of the bushing to approach each other.

As another advantage of my compressible bushing, I will here state that the open slit $a$ will afford a receptacle for retaining oil for keeping the needle-bar properly lubricated.

I am aware that the needle-bars of sewing-machines have been provided with longitudinally-split bushings and laterally-compressing screws therefor; also, that split-ring packings have been used in stuffing-boxes for piston-rods. These features I do not claim, *per se*.

Having described my invention, I claim—

1. In a sewing-machine, the combination of an arm, A, a bearing, B, a concave seat, $c$, formed at the lower end of the bore through this bearing, and a female screw-thread formed at the upper portion of said bore, adapted to receive a tubular nut for compressing a double beveled longitudinally-split bushing, substantially in the manner and for the purposes explained.

2. The combination of the bearing B, formed on the arm of a sewing-machine, the needle-bar C, playing vertically through said bearing, the beveled seat $c$, formed on the bearing, the longitudinally-split bushing D, having beveled ends, and the tubular nut E, having a countersunk end and tapped centrally into the said bearing for the purpose of acting directly on the bushing and contracting the same about the needle-bar, all constructed and arranged to operate substantially as described.

In testimony that I claim the foregoing as my own I affix my signature in presence of two witnesses.

R. H. ST. JOHN.

Witnesses:
W. O. DAKIN,
JOHN D. IRVING.